United States Patent [19]
Mazaris

[11] Patent Number: 5,912,437
[45] Date of Patent: Jun. 15, 1999

[54] SEPARABLE CABLE ROUTING APPARATUS

[76] Inventor: Dennis W. Mazaris, 813 Mosby Hollow Dr., Herndon, Va. 22070

[21] Appl. No.: 08/861,532

[22] Filed: May 22, 1997

[51] Int. Cl.$^6$ ..................................................... H01B 7/00
[52] U.S. Cl. ............................................. 174/135; 211/182
[58] Field of Search .................................. 174/135, 112, 174/72 A, 69, 97, DIG. 8; 248/74.2; 29/857; 211/181, 182

[56] References Cited

U.S. PATENT DOCUMENTS

| | | | |
|---|---|---|---|
| 3,894,706 | 7/1975 | Mizusawa | 248/68.1 |
| 4,424,627 | 1/1984 | Tarbox | 29/857 |
| 4,878,586 | 11/1989 | Bancroft et al. | 211/106 |
| 5,589,667 | 12/1996 | Tsukazaki et al. | 174/135 |

FOREIGN PATENT DOCUMENTS 722128  12/1951  United Kingdom ................... 174/135

*Primary Examiner*—Nestor Ramirez
*Assistant Examiner*—Joseph Waks
*Attorney, Agent, or Firm*—Rodger H. Flagg

[57] ABSTRACT

Two opposing cable routing assemblies each have a base portion and a resilient strap portion. The strap portion is releasably secured to the base portion to adjustably and releasably secure multiple cables therein. The cable is bent about the radiused end portion, to reduce the stress on the bent cable and avoid damage to the radiused cable, as the excess cable is taken up between the opposing cable routing assemblies. A score line is provided on the base portion adjacent to the radiused end portion, to provide a breakaway radiused end portion. An intermediate cable routing apparatus may be formed of a flexible coiled wrap portion, or a flexible spiral wrap portion. The cable routing apparatus may be marked with indicia to identify a selected cable.

16 Claims, 2 Drawing Sheets

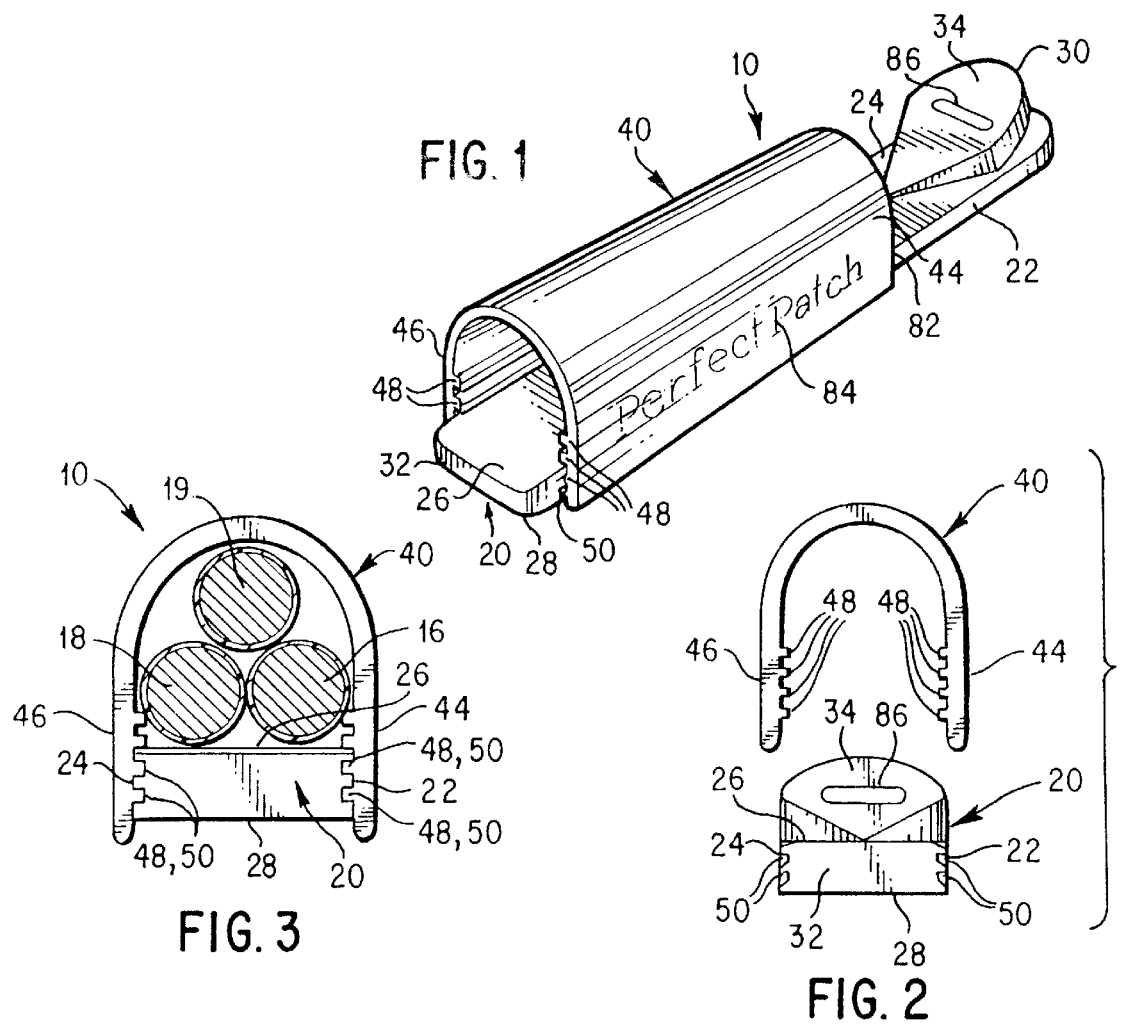
FIG. 1
FIG. 3
FIG. 2
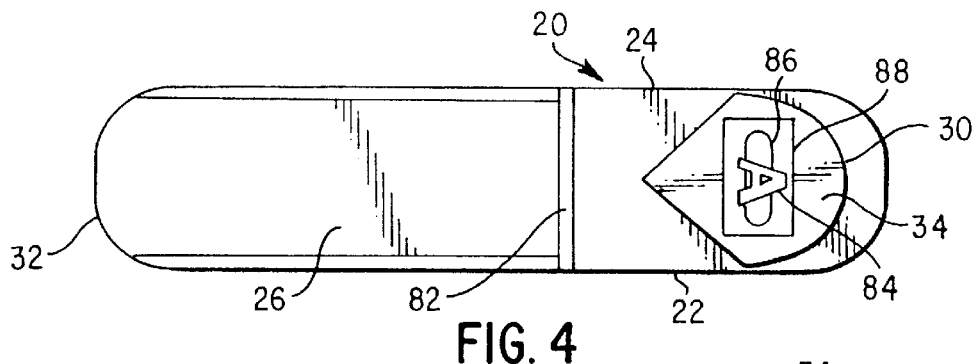
FIG. 4
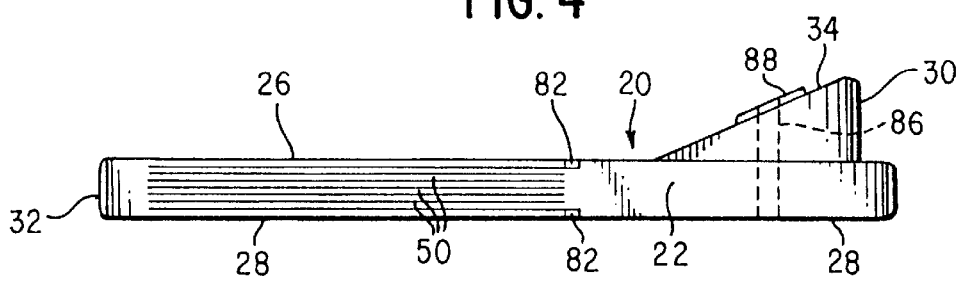
FIG. 5

SEPARABLE CABLE ROUTING APPARATUS

This patent application relates to a copending application, Ser. No. 08/861,531 filed 05/22/97, entitled HINGED CABLE ROUTING APPARATUS, by Dennis Mazaris.

BACKGROUND OF THE INVENTION

DEFINITIONS

For purposes of this invention, the term "cable" is intended to include electrical cable, insulated electric wire, uninsulated electric wire, twisted wire cable, fiber optic cable, plastic cable, and all cable conforming to the "Commercial Building telecommunications Cabling Standard TIA/EIA568-A and ISO/IEC 11801, which are incorporated by reference herein.

Cable routing is a problem where cable is pre-assembled, and excess cable length has been provided to assure sufficient length for connection of a plurality of cable to a fixed location. Where numerous cables are connected to a fixed location, the excess length of each of the cables becomes a problem, creating a "rat's nest" of tangled cable, which is difficult to work with, and may create a safety hazard where emergency repairs are quickly needed.

U.S. Pat. No. 3,520,988 issuing to Ralph Ballock on Jul. 21, 1970 discloses a cable support for temporarily reducing the overall length and to eliminate tangled excess lengths.

U.S. Pat. No. 4,475,649 issuing to Willem Haarbosch on Oct. 9, 1984, discloses a storage case for an electric cord.

U.S. Pat. No. 5,168,128 issuing to Alan Thomsen on Dec. 1, 1992, discloses an anti-tangle spaced stiffener for elongated flexible members, to prevent tangling and for folding the elongated flexible member into a compact storage relationship.

U.S. Pat. No. 5,144,100 issuing to Gregory Andel on Sep. 1, 1992 discloses a wire separator apparatus having a cover flap and parallel mounting flanges.

SUMMARY OF THE INVENTION

The separable cable routing apparatus disclosed herein, comprises a base portion and a separate resilient strap portion. The base portion has at least one tab located on opposing sides of the base portion. The strap portion has opposing catches located on opposing sides of the resilient inverted U-shaped strap portion. The opposing catches are positioned to engage the opposing tabs located on the base portion, to adjustably secure at least two cable portions therein. The base portion further has a tapered, radiused end portion, which serves to support the cable when the cable is bent about the radiused end portion, thus reducing the stress on the bent cable and preventing the cable from being kinked or damaged.

A score line may extend between the first and second sides of the base portion between the radiused end portion and the strap portion, enabling the user to break off the radiused end portion, to utilize the remaining portion of the separable cable routing apparatus as an intermediate cable routing apparatus.

Alternately, the intermediate cable routing apparatus may comprise a flexible coiled wrap portion or a flexible spiral wrap portion to retain two or more cable portions together at a location between the opposing radiused end portions.

The separable cable routing apparatus strap portion or base portion may be marked with indicia, such as color coding, symbols, letters or numerals, to identify the cable routed within the cable routing apparatus, for ease of identifying and locating a specific cable.

BRIEF DESCRIPTION OF THE DRAWINGS

FIG. 1 is a perspective view of the separable cable routing apparatus used to reduce the cable length about a fixed location.

FIG. 2 is an elevation view of the separable cable routing apparatus, with the strap portion positioned in spaced relation above the base portion.

FIG. 3 is an elevation view of the separable cable routing apparatus, with the strap portion closed about three cables.

FIG. 4 is a plan view of the separable cable routing apparatus shown in FIG. 1.

FIG. 5 is an elevation view of the separable cable routing apparatus shown in FIG. 4.

DESCRIPTION OF THE PREFERRED EMBODIMENTS

Figure 6:
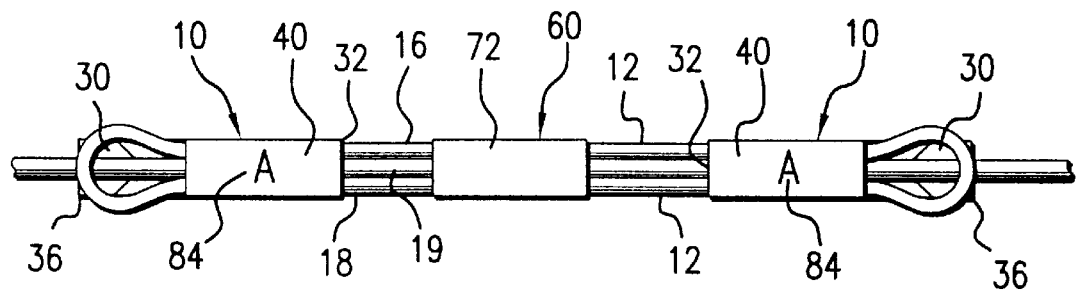
FIG. 6 is a plan view of opposing, separable cable routing apparatus installed upon a cable, with an intermediate cable routing apparatus positioned in spaced relation between the opposing cable routing apparatus.

The subject matter which I regard as my invention is particularly pointed out and distinctly claimed in the claims. The structure and operation of my invention, together with further objects and advantages, may be better understood from the following description given in connection with the accompanying drawings, in which:

FIG. 6 shows one of a plurality of separable cable routing apparatus 10 used to organize a plurality of cable 12 nested about a fixed location (not shown), such as a patch panel or terminal box. The cable 12 may be any selected size of insulated or uninsulated electrical wire, fiber optic, or plastic cable, and includes all cable conforming to the "Commercial Building Telecommunications Cabling Standards", published as TIA/EIA-568A, or ISO/IEC 11801 which is incorporated by reference herein.

Various sizes of the separable cable mounting apparatus 10 may be provided to suit various sizes of cable diameters, in accordance with the intended use of the user.

The separable cable mounting apparatus 10 is preferably made of a non-conductive material, such as plastic. The cable mounting apparatus 10 is preferably molded as a base portion and a separate cap portion. This provides advantages of low-cost, and the separable cable routing apparatus 10 may be releasably assembled upon cable 12 without the need for hand or power tools.

As shown in FIG. 1 through FIG. 5, the separable cable routing apparatus 10 comprises a base portion 20, having opposing sides 22, 24, a top side 26 and a bottom side 28. The base portion 20 further includes a radiused end portion 30 and an opposite end portion 32. Preferably, the radiused end portion 30 is tapered 34 as shown in FIG. 3. The radiused end portion 30 provides support for the cable 12 as it is routed approximately 180 degrees about the radiused end portion 30, substantially relieving stress on the bent portion 36 of the cable 12, and by not allowing the cable 12 to kink as it is radiused about the radiused end portion 30.

The radiused end portion 30 enables the user to compactly route the cable 12 to take up excess slack in the preassembled cable 12, without damage to the cable 12, and still maintain electrical performance compliant to cable standards.

The resilient strap portion 40 is preferably configured in the form of an inverted U-shape, to conform to the shape of the cables routed within the separable cable routing apparatus 10.

The opposing sides 44, 46 of the resilient strap portion 40 each contain at least one engaging member 52 selected from an engaging catch 48 or an engaging tab 50 positioned to selectively engage at least one engaging member 52 located on opposing sides 22, 24 of the base portion, to adjustably and releasably secure the strap portion 40 to the base portion 20. Preferably, engaging member 52 located upon opposing sides of the base portion 20 selectively engage the opposing engaging member 52 located upon opposing sides of the resilient strap portion 40, to adjustably and releasably secure the separable cable routing apparatus 10 about the cable portions 16, 18, 19.

The engaging catches 48 may be located in spaced relation on opposing sides of the resilient strap portion 40, to selectively engage the opposing engaging tabs 50 positioned upon the opposing sides of the base portion 20, to adjustably secure the cable routing apparatus about the cable portions 16, 18, 19.

Alternately, the engaging tabs 50 may be located in spaced relation on opposing sides of the resilient strap portion 40, to selectively engage opposing engaging catches 48 positioned upon the opposing sides of the base portion 20, to adjustably secure the cable routing apparatus about the cable portions 16, 18, 19.

In this way, the resilient strap portion 40 may be adjustably secured to the base portion 20 to provide a snug fit about the cable 12 enclosed within the cable routing apparatus 10. A single separable cable routing apparatus 10 may be used to secure a variety of cable 12 diameters, eliminating the need to manufacture, stock and carry a variety of cable routing apparatus 10 sizes to suit most preassembled cable 12 used in a selected fixed location (not shown).

The separable cable routing apparatus 10 may be quickly assembled about the cable 12 in proximity to a fixed location, such as a terminal box, thus eliminating excess cable 12 slack. The cable 12 may be organized in a manner to easily locate, identify and change, repair or add cable 12 to a selected fixed location.

The resilient strap portion 40 is released from the base portion 20 by biasing the opposing catches 48 away from the engaging tabs 50 located upon opposing sides 22, 24 of the base portion 20, and then withdrawing the resilient strap portion 40 from the base portion 20. Alternately, the resilient strap portion 40 may be slidably moved in relation to the base portion 20, to remove the resilient strap portion 40 from the base portion 20.

Excess cable 12 is bent approximately 180 degrees around the radiused end portion 30 of the separable cable routing apparatus 10, to align a second cable portion 18 of the cable 12 adjacent to the first cable portion 16. A third cable portion 19 is also secured within the separable cable routing apparatus 10, as shown in FIG. 3.

The resilient strap portion 40 is placed over the first, second and third cable portions 16, 18, 19, and biased towards the base portion 20 to engage the opposing catches 48 located upon the resilient strap portion 40 with the tabs 50 located along the opposing sides 22, 24 of the base portion 20, thus securing the cables 16, 18, 19 between the strap portion 40 and the top side 26 of the base portion 20, with a portion of the cable 12 supported about the radiused end portion 30.

The opposing catches 48 located on the opposing sides 44, 46 of the resilient strap portion 40 are sized to engage the opposing tabs 50 located on opposing sides 22, 24 of the base portion 20 to secure the first, second and third cable portions 16, 18, 19 therebetween. More than one tab 50 may be positioned in spaced parallel relation on opposite sides 22, 24 of the base portion 20, to provide adjustable, selective securement positions to accommodate various sized cable 12. Alternately, more than one catch 48 may be positioned in spaced parallel relation on opposing sides 44, 46 of the strap portion 40, to provide adjustable, selective securement positions to accommodate various sized cable 12.

As shown in FIG. 6 the excess cable slack is formed into a loop, and a first separable cable mounting apparatus 10 is secured about one end of the loop. A second, separable opposing cable mounting apparatus 10 is then used to direct the cable 12 back towards the first separable cable mounting apparatus 10, to gather up the excess cable 12 in proximity to the fixed cable connection location, or at any other convenient location along the pre-assembled cable 12. The first and second separable cable mounting apparatus 10 are preferably adapted to receive a third cable portion 19 therein, as shown in FIG. 6.

Once the separable cable mounting apparatus 10 is loosely installed on the excess cable 12, it may be slidably positioned along the excess cable 12 loop, and locked in a desired position by compressing the resilient strip portion 40 firmly against the base portion 20, securing the opposing catches 48 and opposing tabs 50.

In this way, excess preassembled cable 12 may be routed to take up the excess slack, and provide neat and organized cable 12 routing at a selected fixed location to accommodate the orderly connection of a plurality of preassembled cables 12, as shown in FIG. 6.

Figure 7:
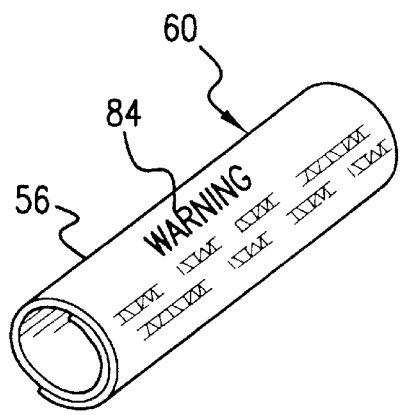
FIG. 7 is a perspective view of a flexible coiled wrap portion adapted for use as an intermediate cable routing apparatus.
Figure 8:
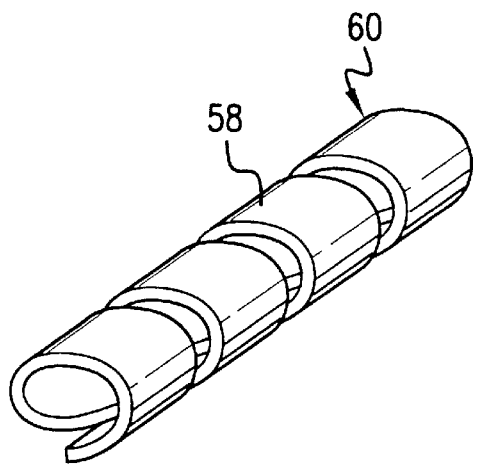
FIG. 8 is a perspective view of a flexible spiral wrap portion used to secure multiple cable together between the opposing radiused cable routing apparatus.

The excess cable slack may thus be organized for each cable having excess slack, thus providing a neat, organized configuration where modifications, changes and repairs may be easily and quickly made.

Where opposing, separable cable routing apparatus 10 are spaced sufficiently apart, one or more intermediate cable routing apparatus 60 may be used to provide additional control of the cable 12. The intermediate cable routing apparatus 60 may be in the form of a flexible coiled wrap 56 made from a precoiled plastic, as shown in FIG. 7; or a flexible spiral wrap 58 made of a spiral wound plastic, as shown in FIG. 8. Preferably, the intermediate cable routing apparatus is made from resilient plastic which is from one to six inches long, and from 0.010 to 0.093 inches thick.

Figure 9:
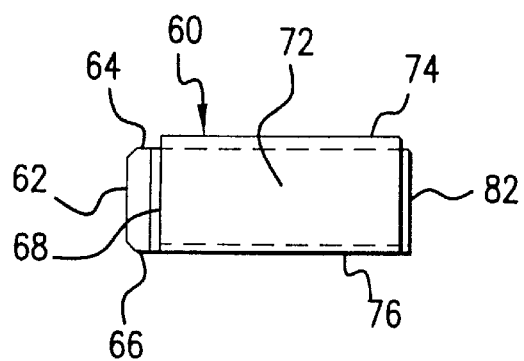
FIG. 9 is a plan view of an intermediate cable routing apparatus wherein the radiused end portion has been snapped away at the score line shown in FIG. 4.

The intermediate cable mounting apparatus 60 shown in FIG. 9, preferably comprises a base portion 62 having a first side 64, a second side 66, a top side 68 and a bottom side similar to bottom side 70. The opposing sides 74, 76 of the base portion 62 each include at least one engaging tab, similar to engaging tab 50. The engaging tabs are positioned to receive a catch similar to catch 48. The catch is located upon opposing sides 74, 76 of the resilient strap portion 72. The resilient strap portion 72 is preferably of an inverted U-shaped configuration, to enclose the cable 12 between the strap portion 72 and the base portion 62, but unlike the separable cable routing apparatus 10 previously disclosed, there is no radiused end portion 30 required on the intermediate cable mounting apparatus 60.

In order to eliminate the need for stocking both the radiused separable cable routing apparatus 10 and the intermediate cable mounting apparatus 60, a score line 82 may be provided on at least one of the opposing sides 22, 24 of the base portion 20 of the separable cable mounting apparatus 10, between the strap portion 40 and the inclined, radiused end portion 30, as shown in FIG. 4 and FIG. 5. The score line 82 may be on either the top or bottom side 26, 28 of the base portion 20, and is shown by way of an example embodiment, on the top side in FIG. 4 and on both the top and bottom sides in FIG. 5. Thus, the radiused end portion 30 may be snapped off from the remainder of the base portion 20 by forcibly bending the cable routing apparatus 10 at the score line 82, to convert a radiused cable mounting apparatus 10 into an intermediate cable mounting apparatus 60.

The separable cable mounting apparatus 10 disclosed herein, may be readily adapted for use both for the radiused bending of cable 12 and for the intermediate connection of cable 12, as shown in FIG. 6. Alternately, the intermediate cable mounting apparatus 60 may be in the form of a flexible coil wrap portion 56 shown in FIG. 7; or the intermediate cable mounting apparatus 60 may be a flexible spiral wrap portion 58, as shown in FIG. 8, in accordance with manufacturing or user preference.

The multiple engaging tabs 50 on base portion 20 enable the user to selectively position first and second cable portions 16, 18, or first, second and third cable portions 16, 18, 19 between the strap portion 40 and the base portion 20. This is also true for intermediate cable routing apparatus 60.

Where cable 12 is in need of repair, relocation or replacement, the separable cable routing apparatus 10 disclosed herein may be easily removed from the cable 12 by disengaging the opposing catches 48 located on the opposing sides 44, 46 of the resilient strap portion 40 from the opposing tabs 50 located on the opposing sides 22, 24 of the base portion 20. Once removed, the cable routing apparatus 10 may be reused, repaired, or rerouted, as needed.

Thus, the cable routing apparatus 10 disclosed herein, is adaptable for use with a variety of cable sizes and quantity of cable 12, is adaptable for use with a radiused end portion 30 to compactly route cable 12 approximately 180 degrees to reverse direction, as needed to reduce or eliminate slack cable 12. The cable routing apparatus 10 may also be adapted for use as an intermediate cable routing apparatus 60, to organize and retain preassembled cable 12 at a fixed location.

The cable routing apparatus 10 may include indicia 84, such as symbols, letters, numerals, color coding, bar coding, or an icon 88, upon either the strap portion 40 or the base portion 20, for ease of identifying the cable 12 retained within the cable routing apparatus 10. The indicia 84 may also be used for instruction, or as a warning, to suit selected conditions.

A slot 86 may be provided in the base portion 20 to receive a removable icon 88 having indicia 84 thereon. Preferably, the slot is located upon the tapered portion 34 of the radiused end portion 30 of the base 20 as shown in FIG. 4. The removable icon 88 enables the user to move the cable identifying indicia 84 located upon the icon 88, when the cable 12 is moved, providing reusable indicia 84 adaptable for use on any new or existing separable cable routing apparatus 10.

While this invention has been described with reference to a particular embodiment, it is to be understood that modifications and adaptations may be made to this invention without departing from the spirit of the invention or from the scope of the following claims.

INDUSTRIAL APPLICABILITY

The cable routing apparatus 10 disclosed herein is directed for use in organizing and retaining a plurality of preassembled cable 12 located at a fixed location, such as a patch panel or terminal box, and for eliminating excess slack in prefabricated cables.

What is claimed is:

1. A separable cable routing apparatus, comprising:
   a) a base portion having opposing first and second sides, a top side and a bottom side, the base portion further having a raised above and tapered toward the loase, radiused end portion and an opposite end portion; the opposing first and second sides of the base portion each having at least one base engaging member selected from a base tab and a base catch located thereon; and
   b) a resilient, U-shaped strap portion having opposing sides; at least one complementary strap engaging member selected from a strap tab and a strap of the catch located upon each of the opposing sides of the strap portion, the complementary strap engaging member is positioned to engage the base engaging member located upon the first and second sides of the base portion; the resilient strap portion forming a releasable open ended enclosure between the strap portion and the base portion, and wherein a cable portion is radiused in a loop about said radiused end portion and releasably secured by the separable cable mounting apparatus to take up a cable slack.

2. The separable cable routing apparatus of claim 1, wherein said at least one multiple base engaging member comprises base engaging members, and said multiple base engaging members are positioned upon the opposite sides of the base portion in a spaced parallel alignment to provide a selective adjustment of the strap portion in relation to the base portion to releasably secure the cable portion within the cable routing apparatus.

3. The separable cable routing apparatus of claim 1, wherein the strap portion is molded in one piece from a non-conductive, resilient plastic material; and the base portion is molded as a separate peace of non-conductive plastic material.

4. The separable cable routing apparatus of claim 1, wherein a score line is provided upon at least one of the top and bottom sides of the base portion, the score line being located adjacent to the radiused end portion, to provide a break-away radiused end portion, wherein the separable cable routing apparatus without the break-away radiused end portion may be used as an intermediate cable routing apparatus.

5. The separable cable routing apparatus of claim 1, wherein indicia are releasably secured to at least one of, the resilient strap portion and the base portion.

6. The separable cable routing apparatus of claim 1, wherein said at least one base engaging member comprises multiple base engaging tabs, said multipe base engaging tabs are positioned in a spaced parallel alignment upon the opposite sides of the base portion to selectively engage and releasably secure the opposing strap catch located upon each of the opposing sides of the resilient strap portion.

7. The separable cable routing apparatus of claim 1, wherein the base portion has a slot sized to receive a removable icon therein, the icon having selected indicia thereon.

8. A separable cable routing apparatus, which comprises:
a) a base portion having opposing first and second sides, a top side and a bottom side, the base portion further having a raised, radiused end portion and an opposite end portion, the opposing first and second sides each having at least one base engaging member, selected from a base tab and a base catch located thereon; and
b) a resilient strap portion having opposing sides, with each of the opposing sides having at least one complementary strap engaging member, selected from a strap tab and a strap catch, to selectively releasably secure the complementary strap engaging member to the base engaging member, forming a releasably secured, open ended enclosure between the strap portion and the base portion, the cable routing apparatus sized to receive three cable portions therebetween, and one of the cable portions is radiused in a loop about said raised, radiused end portion, and a score line is provided upon at least one of the top and bottom sides of the base portion, the score line being located adjacent to the radiused end portion, to provide a break-away radiused end portion, and wherein the separable cable routing apparatus without the break-away radiused end portion may be used as an intermediate cable routing apparatus.

9. The separable cable routing apparatus of claim 8, wherein the strap portion is molded in one piece from a non-conductive, resilient plastic material, and the base portion is molded as a separate piece of non-conductive plastic material.

10. The separable cable routing apparatus of claim 8, wherein indicia are located upon at least one of, the strap portion and the base portion, of the cable routing apparatus.

11. The separable cable routing apparatus of claim 8, wherein the base portion has a slot sized to receive a removable icon therein, the icon having selected indicia thereon.

12. Opposing separable cable routing apparatus for releasably securing excess cable slack on a preassembled cable, which comprises:
a) a first and a second cable routing apparatus, each having a base portion, opposing first and second sides, a top side and a bottom side, the base portion further having a raised above and tapered toward the base, radiused end portion and an opposite end portion, the opposing first and second sides further having multiple base engaging members each selected from a base tab and a base catch;
b) the first and the second cable routing apparatus each having a removable resilient strap portion having opposing sides, the opposing sides of the strap portion each having multiple complementary strap engaging members each selected from a strap tab and a strap catch, the complementary multiple engaging strap members positioned to engage the multiple base engaging members, thus forming a selectively positioned open ended enclosure between the resilient strap portion and the top side of the base portion, the first and the second cable mounting apparatus each releasably secured in a spaced relation along a looped cable portion to take up an excess cable slack; and
an intermediate cable routing apparatus positioned in spaced relation between the opposing first and second cable mounting apparatuses.

13. The opposing separable cable routing apparatus of claim 12, wherein the intermediate cable routing apparatus comprises a flexible coiled wrap portion.

14. The opposing separable cable routing apparatus of claim 12, wherein the intermediate cable routing apparatus comprises a flexible spiral wrap portion.

15. The opposing separable cable routing apparatus of claim 12, wherein the intermediate cable routing apparatus comprises a third cable routing apparatus having a score line extending between the first and second sides of the base portion, at a location adjacent to the radiused end portion, and wherein the radiused end portion of the third cable routing apparatus is snapped at the score line to remove the radiused end portion from the strap portion, thus forming the intermediate cable routing apparatus from the third cable routing apparatus.

16. The separable cable routing apparatus of claim 12, wherein the base portion has a slot sized to receive a removable icon therein, the icon having selected indicia thereon.

* * * * *